Aug. 27, 1957  F. J. MORRIS  2,803,966
MICROMETRIC DIAL ASSEMBLY
Filed March 8, 1956  2 Sheets-Sheet 1

INVENTOR
Fred J. Morris
BY
ATTORNEYS

Aug. 27, 1957   F. J. MORRIS   2,803,966
MICROMETRIC DIAL ASSEMBLY
Filed March 8, 1956   2 Sheets-Sheet 2

INVENTOR
Fred J. Morris
BY Ashley & Ashley
ATTORNEYS

United States Patent Office 2,803,966
Patented Aug. 27, 1957

2,803,966

MICROMETRIC DIAL ASSEMBLY

Fred J. Morris, Austin, Tex., assignor to The Electro Mechanics Company, Austin, Tex., a corporation of Texas Application March 8, 1956, Serial No. 570,288

7 Claims. (Cl. 74—10.52)

This invention relates to new and useful improvements in micrometric dial assemblies.

One object of the invention is to provide an improved micrometric dial assembly for use with a precision instrument and of such construction as to be capable of imparting a direct drive to a shaft of the instrument as well as fine adjustments in any position of the instrument shaft.

A particular object of the invention is to provide an improved dial assembly, of the character described, having a high ratio of reduction whereby micrometer adjustments may be readily imparted to the precision instrument.

An important object of the invention is to provide an improved dial assembly, of the character described, wherein micrometer adjustments are obtained by a pinion having its teeth in mesh with the peripheral teeth of a pair of coaxial spur gears for imparting rotation to one of the gears relative to the other gear, the rotatable gear having one more or less tooth than the fixed gear whereby said rotatable gear turns an amount dependent upon the number of teeth of said gears and the difference between the number of teeth upon rotation of the pinion relative to said fixed gear so as to produce a high ratio of reduction between said gears.

Another object of the invention is to provide an improved dial assembly, of the character described, wherein the fixed gear is held against rotation by friction means so as to produce a high ratio of reduction between said gears.

Another object of the invention is to provide an improved dial assembly, of the character described, wherein the fixed gear is held against rotation by friction means so as to permit slippage and turning of said fixed gear with the rotatable gear upon direct drive of the spur gears.

A further object of the invention is to provide an improved dial assembly, of the character described, wherein the pinion is in constant mesh with each of the spur gears so as to eliminate backlash.

A construction designed to carry out the invention will be hereinafter described together with other features of the invention.

Figure 1:
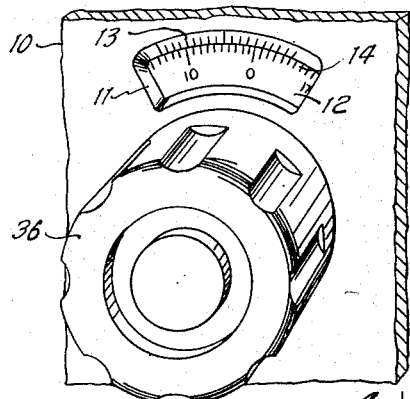
Figure 3:
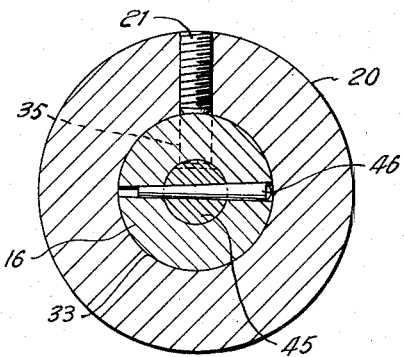
Figure 2:
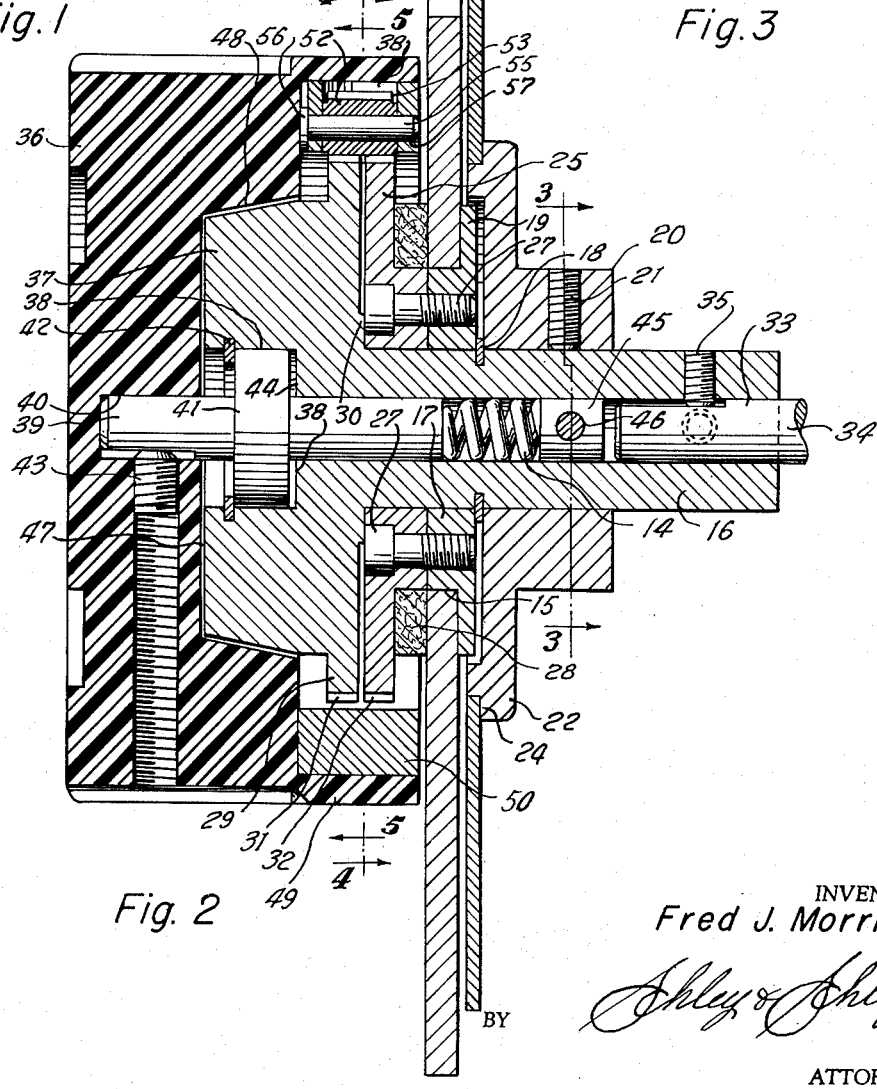
Figure 4:
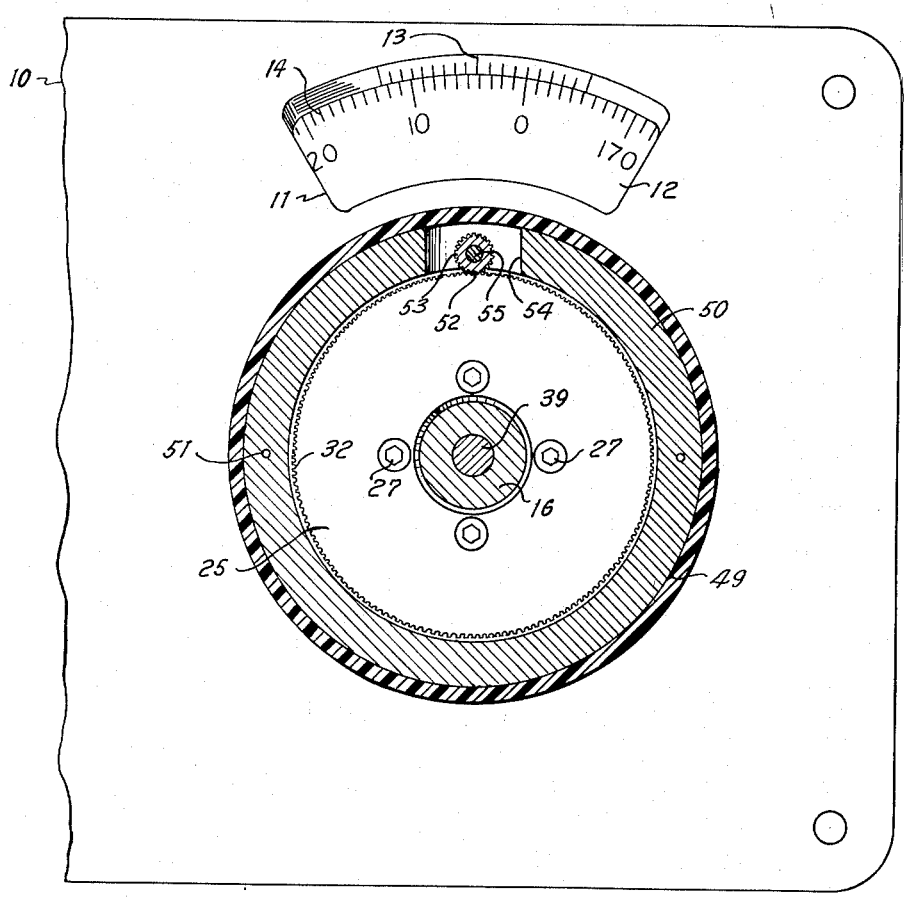
Figure 5:
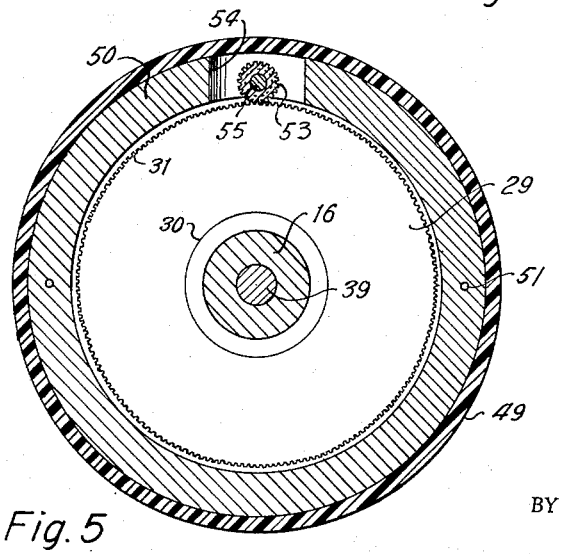
Figure 6:
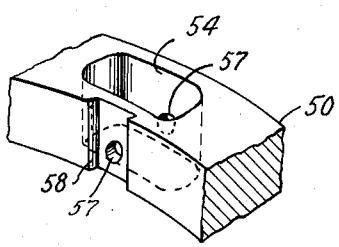

The invention will be more readily understood from a reading of the following specification and by reference to the accompanying drawings, wherein an example of the invention is shown, and wherein:

Fig. 1 is a perspective view of a micrometric dial assembly constructed in accordance with the invention, Fig. 2 is an enlarged transverse, vertical, sectional view of the dial assembly, Fig. 3 is a cross-sectional view, taken on the line 3—3 of Fig. 2, Fig. 4 is a reduced cross-sectional view, taken on the line 4—4 of Fig. 2, Fig. 5 is a reduced cross-sectional view, taken on the line 5—5 of Fig. 2, and Fig. 6 is an enlarged, perspective view of a portion of the knob ring showing the opening for mounting the pinion.

In the drawings, the numeral 10 designates the mounting panel or plate of a dial assembly embodying the features of the invention and forming a part of a precision instrument (not shown). An arcuate opening or window 11 is provided in the upper portion of the panel for permitting observation of an annular position dial 12 mounted behind said panel as shown most clearly in Fig. 2 and as described hereinafter. The window 11 has vernier divisions 13 for coacting with graduations 14 on the outer face of the dial 12. Below the window, the panel 10 has a circular opening 15 of relatively large diameter for receiving an output shaft 16 in axial, spaced relation. An annular, flanged bushing or mounting element 17 centers the shaft 16 with respect to the opening 15 and is confined against displacement by a snap ring 18 encircling said shaft. As shown by the numeral 19, the radial flange of the bushing 17 overlies the inner or rear surface of the panel in concentric, spaced relation to the dial 12. A collar or hub 20 is fixed by a set screw 21 on the shaft rearwardly of the bushing and its snap ring and has a radial flange 22 for supporting the position dial. The flange 22 may have an annular offset portion 23 which encircles the bushing flange 19 in spaced relation and provides a peripheral recess 24 for receiving the dial 12.

A spur gear 25 encircles the shaft 16 and has an axial, rearwardly-directed hub 26 abutting the bushing 17 and fastened thereto by suitable screws 27 whereby said shaft is journaled in or rotatably supported by the gear and bushing. For resisting rotation of the spur gear 25, an annular, friction element or slip ring 28 of fiber or other suitable material encircles the hub 26 so as to be confined between said gear and the front or outer surface of the panel 10. It is noted that the frictional resistance of the slip ring 28 may be varied by adjusting the screws 27. A coaxial spur gear 29 is made integral with the front or outer end of the output shaft in overlying, parallel relation to the gear 25. It is noted that the gears are of the same diameter and that the gear 29 has a small hub projection 30 for spacing said gears from each other to facilitate relative turning of said gear 29. As will be explained, the output gear 29 has one tooth 31 more or less than the number of teeth 32 of the gear 25, which serves as a reference gear.

The shaft 16 is tubular and has an axial bore 33 extending therethrough for receiving one end of the shaft 34 of the precision instrument. One or more set screws 35 are provided for connecting the shafts against relative rotation. A circular knob 36 is provided for imparting rotation to the instrument shaft 34 through the output gear 29 and tubular shaft 16 (Figs. 1 and 2). The output gear has a coaxial, frustoconical clutch member or cone clutch 37 made integral therewith and projecting forwardly therefrom for coacting with the knob 36. It is noted that the clutch member 37 is of relatively large diameter and has an axial bore 38 communicating with the front end of the shaft bore 33, which extends through the output gear into said clutch member, and forming a counterbore for said bore. A spindle 39 projects from an axial socket 40 formed in the inner surface of the knob and is journaled in the front end portion of the bore 33 for rotatably supporting said knob. The spindle 39 has a radial enlargement or boss 41 rotatably confined within the counterbore 38 by a snap ring 42, and a suitable set screw 43 fastens the outer end of said spindle within the socket 40. It is noted that the effective depth of the counterbore is greater than the axial width of the radial boss 41 to permit axial movement of the knob and spindle relative to the output gear and its clutch member (Fig. 2).

A helical spring 44 is confined within the bore 33 between the inner end of the spindle 39 and a retaining plug 45 for urging said spindle and knob outwardly of the output gear and clutch member. As shown in Figs. 2 and 3, the plug 45 is fixed within the tubular shaft 16 by a transverse pin 46. The knob 36 has a complementary recess 47 in its inner surface for coacting engagement with the clutch member 37. Due to the frustoconical wall or peripheral surface 48 of the recess 47, the knob may be moved into engagement with the clutch member by pressing said knob inwardly to provide a direct drive with the output gear 29 and shaft 16. Due to the spring 44, the knob is constantly urged outwardly and held out of engagement with the clutch member.

The knob 36 has an axially-extending, peripheral portion or flange 49 at its inner end for positioning an annular, supporting element or ring 50 in concentric, spaced relation to the spur gears 25 and 29.

Although the ring 50 has a press fit within the flange 49, preferably, said ring is secured to the knob by suitable pins or other means 51 as shown in Figs. 4 and 5 to prevent relative rotation of said ring. If desired, the ring may be made integral with the knob or its flange.

A pinion 52 is supported by the ring with its teeth 53 in constant meshing engagement with the teeth 31 and 32 of the spur gears 29 and 25. The ring has a radial opening or slot 54 for receiving the pinion 52 which is journaled on an axially-extending pin 55 having a flange or head 56 on one of its ends. As shown most clearly in Fig. 6, alined openings 57 communicate with and extend transversely of the slot 54 for supporting engagement by the pin 55. In order to prevent displacement of the pin, a radial groove 58 is formed in the lateral surface of the ring 50 adjacent the knob to accommodate the head 56 of said pin.

Since the ring 50 forms a part of the knob 36, it is obvious that the pinion 52 revolves about the spur gears 25 and 29 upon rotation of said knob. Rotation of the reference gear 25 being resisted by the frictional engagement of the slip ring 28 with said gear and the panel 10, revolving movement of the pinion imparts a slight rotational movement to the output gear 29 and its tubular shaft 16 relative to said reference gear. Due to the output gear having one tooth more or less than the reference gear, rotation of the pinion and knob turns said output gear an amount dependent upon the number of teeth of the gears and the difference between the number of teeth. The ratio or relative amount of turning between the output gear and knob is subject to variation and is controlled by the number of teeth as well as the difference between the numbers of teeth on the reference and output gears and either gear may have one tooth more or less than the other gear. For example, the reference gear may have 201 teeth and the output gear 200 teeth whereby the ratio or relative amount of rotation between the output gear and knob is 201:1. Manifestly, very fine or micrometric adjustments of the instrument shaft 34 may be obtained by the high ratio of reduction produced by this arrangement. Due to the vernier window 11 and the graduations or divisions 13 and 14 of said window and the dial 12, a constant reading of the adjustment is provided.

A direct drive between the knob 36 and output gear 29 is obtained by engagement of the clutch surface 48 with the clutch member 37. This engagement is accomplished by pressing the knob inwardly, it being noted that the pinion 52 moves inwardly with said knob with its teeth 53 remaining in mesh with the teeth 31 and 32 of the gears 29 and 25. Upon rotation of the inwardly-pressed knob, the pinion 52 serves to lock the reference gear 25 to the output gear 29 so that both gears turn with said knob. The frictional resistance of the slip ring 28 is insufficient to prevent this rotation of the reference gear. Due to the direct drive arrangement, coarse or relatively large adjustments may be imparted to the instrument shaft without the necessity of turning the knob through many revolutions. Upon release of the knob, the force of the spring 44 exerted upon the spindle 39 moves said knob out of engagement with the clutch member to permit minute adjustment and accurate setting of the instrument shaft by the pinion. Due to the constant meshing engagement of the pinion with the spur gears, blacklash between the movement of the knob and output shaft 16 is eliminated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A micrometric dial assembly for a precision instrument including a pair of coaxial gears having peripheral teeth, the first of the gears having one tooth more or less than the second of said gears, means connecting the first gear to the shaft of a precision instrument, a dial having connection and rotatable with said first gear, friction means engaging the second gear for resisting rotation thereof, a pinion having its teeth in constant mesh with the peripheral teeth of said gears, rotatable means for supporting and revolving the pinion around said gears to impart a slight rotational movement to said first gear relative to said second gear upon rotation of said pinion around said gears, the rotatable means being engageable with said first gear to provide a direct drive therebetween said pinion locks said gears against relative rotation and both gears turn with said rotatable means.

2. A micrometric dial assembly as set forth in claim 1 including coacting clutch means carried by the first gear and rotatable means to provide the direct drive therebetween.

3. A micrometric dial assembly as set forth in claim 1 wherein the connecting means includes a shaft having the position dial mounted thereon.

4. A micrometric dial assembly as set forth in claim 1 wherein the rotatable means includes a knob supported by the first gear for relative rotation, the pinion being carried by the knob in overlying relation to the peripheries of the gears.

5. A micrometric dial assembly as set forth in claim 4 including clutch means carried by the first gear, the knob having a complementary clutch surface and being mounted for axial movement relative to said first gear for engaging the clutch surface with the clutch means to provide the direct drive between said knob and first gear.

6. A micrometric dial assembly for a precision instrument including a panel, a pair of coaxial gears rotatably supported by the panel and having peripheral teeth, one of the gears having more teeth than the other gear, a shaft extending through the second gear for rotatably supporting the first gear and connection with a precision instrument, a dial mounted on the shaft, a friction element confined between said second gear and panel for resisting rotation of said second gear, a knob supported by said first gear for relative rotation and axial movement, a pinion carried by the knob and having its teeth overhanging and in constant mesh with the peripheral teeth of said gears for revolving therearound upon relative rotation of said knob whereby a slight rotational movement is imparted to said first gear relative to said second gear upon rotation of the pinion around said gears, and clutch means carried by said knob and first gear and engageable upon relative axial movement of said knob to provide a direct drive therebetween for turning said gears with said knob.

7. A micrometric dial assembly for a precision instrument including a pair of coaxial spur gears, having peripheral teeth, the first of the gears having one tooth more or less than the second of said gears, a panel having a window and an opening for rotatably supporting the second gear, a shaft extending through said second gear for rotatably supporting the first gear and connecting said first gear to the shaft of a precision instrument, a position dial mounted on the panel and visible through the window, a friction ring confined between said panel and second gear for resisting rotation of said second gear, a knob supported by said first gear for relative rotation and axial movement, a pinion rotatably supported by the knob and having its teeth in constant mesh with the peripheral teeth of said gears for revolving therearound upon relative rotation of said knob whereby a slight rotational movement is imparted to said first gear relative to said second gear upon rotation of the pinion around said gears, and a coaxial clutch member carried by said first gear, said knob having a complementary clutch surface engageable with the clutch member upon relative axial movement of said knob to provide a direct drive between said first gear and knob for turning both gears with said knob.

No references cited.